United States Patent
Lim et al.

(10) Patent No.: US 9,973,136 B2
(45) Date of Patent: May 15, 2018

(54) METHOD FOR CONTROLLING MOTOR BASED ON VARIABLE CURRENT CONTROLLER GAIN AND ECO VEHICLE THEREOF

(71) Applicant: Hyundai Motor Company, Seoul (KR)

(72) Inventors: Jae-Sang Lim, Suwon-si (KR); Kil-Young Youn, Suwon-si (KR); Jin-Ho Kim, Gunpo-si (KR); Jeong-Bin Yin, Incheon (KR)

(73) Assignee: Hyundai Motor Company, Seoul (KR)

( * ) Notice: Subject to any disclaimer, the term of this patent is extended or adjusted under 35 U.S.C. 154(b) by 0 days. days.

(21) Appl. No.: 15/365,802

(22) Filed: Nov. 30, 2016

(65) Prior Publication Data
US 2018/0083566 A1   Mar. 22, 2018

(30) Foreign Application Priority Data

Sep. 20, 2016   (KR) ........................ 10-2016-0119901

(51) Int. Cl.
*H02P 29/64* (2016.01)

(52) U.S. Cl.
CPC .................................. *H02P 29/64* (2016.02)

(58) Field of Classification Search
CPC ...... H02P 29/64; H02P 21/0003; H02P 27/06; H02P 21/00; H02P 29/60
USPC .......... 318/400.02, 400.12, 400.26, 708, 471
See application file for complete search history.

(56) References Cited

U.S. PATENT DOCUMENTS

| | | | | |
|---|---|---|---|---|
| 6,674,262 B2* | 1/2004 | Kitajima | ................... | H02P 6/10 318/722 |
| 7,392,158 B2* | 6/2008 | Hikawa | ................. | F04B 49/065 318/490 |
| 8,508,162 B2* | 8/2013 | Choi | ..................... | B60L 15/025 318/400.02 |
| 2013/0020971 A1* | 1/2013 | Gallegos-Lopez | . | H02P 21/0089 318/400.02 |
| 2016/0043671 A1* | 2/2016 | Kemp | ................. | H02P 21/0089 318/400.02 |

FOREIGN PATENT DOCUMENTS

| | | |
|---|---|---|
| JP | 2013-126284 A | 6/2013 |
| JP | 2014-87211 A | 5/2014 |
| JP | 5924045 B2 | 5/2016 |
| KR | 10-2009-0062663 A | 6/2009 |
| KR | 10-2015-0145436 A | 12/2015 |

* cited by examiner

*Primary Examiner* — Bentsu Ro
*Assistant Examiner* — Thai Dinh
(74) *Attorney, Agent, or Firm* — Morgan, Lewis & Bockius LLP

(57) ABSTRACT

A method for controlling a motor based on a variable current controller gain may include a temperature function current applying mode in which when a torque command for the motor is detected by an inverter, 3-phase current to be applied to the motor is output to the motor in consideration of a motor temperature of the motor as a function.

18 Claims, 10 Drawing Sheets

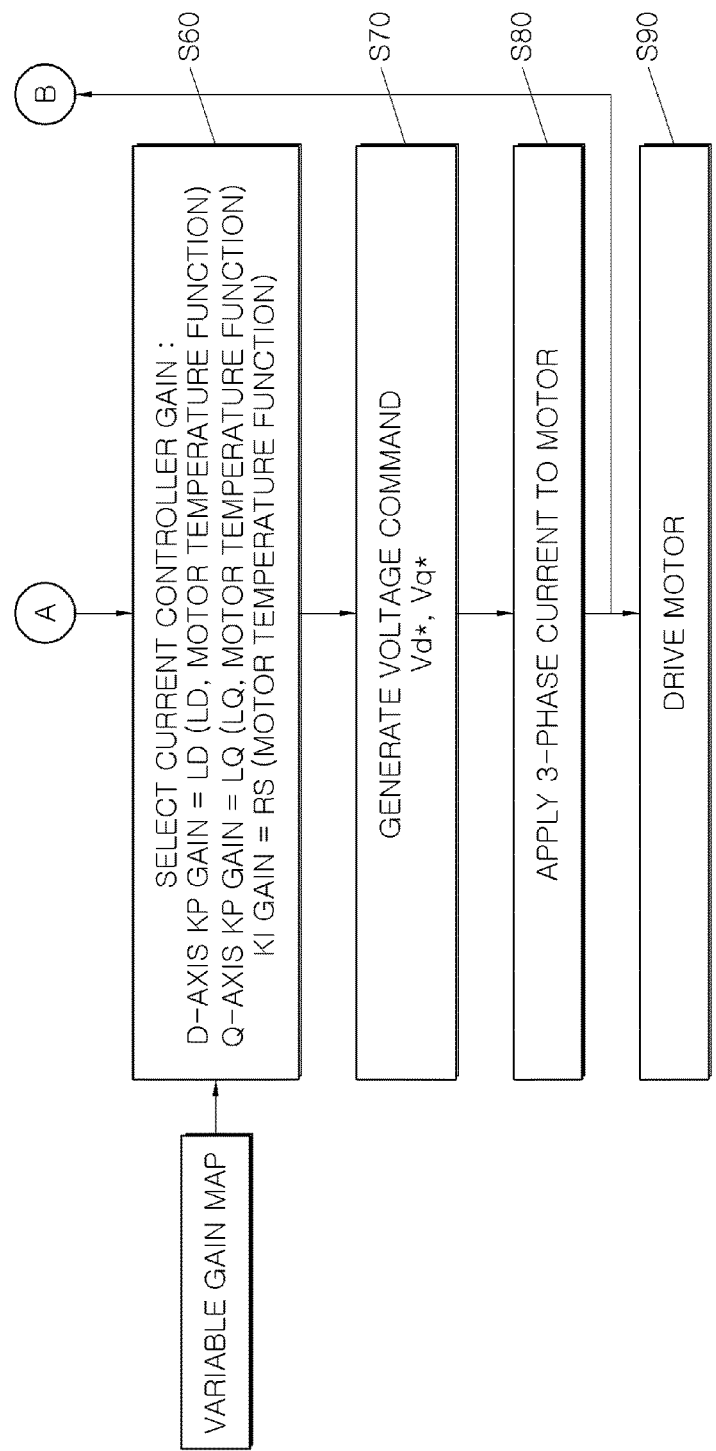

| id [A] | 10 | 20 | 30 | ... | 290 | 300 |
|---|---|---|---|---|---|---|
| LOW TEMPERATURE | 300 | 300 | 30 | ... | 110 | 100 |
| ROOM TEMPERATURE | 400 | 400 | 290 | ... | 210 | 200 |
| HIGH TEMPERATURE | 500 | 500 | 390 | ... | 310 | 300 |
| | | | 490 | | | |

LD TABLE [UH] ACCORDING TO MOTOR TEMPERATURE

| iq [A] | 10 | 20 | 30 | ... | 290 | 300 |
|---|---|---|---|---|---|---|
| LOW TEMPERATURE | 400 | 400 | 390 | ... | 210 | 200 |
| ROOM TEMPERATURE | 500 | 500 | 490 | | 310 | 300 |
| HIGH TEMPERATURE | 600 | 600 | 590 | ... | 410 | 400 |

LQ TABLE [UH] ACCORDING TO MOTOR TEMPERATURE

| TEMPERATURE [°C] | -50 | -40 | -30 | ... | 190 | 200 |
|---|---|---|---|---|---|---|
| RESISTANCE | 100 | 99 | 98 | ... | 77 | 76 |

RS TABLE [mΩ] ACCORDING TO MOTOR TEMPERATURE

METHOD FOR CONTROLLING MOTOR BASED ON VARIABLE CURRENT CONTROLLER GAIN AND ECO VEHICLE THEREOF

CROSS-REFERENCE(S) TO RELATED APPLICATIONS

The present application claims priority to Korean Patent Application No. 10-2016-0119901, filed on Sep. 20, 2016, the entire contents of which is incorporated herein for all purposes by this reference.

BACKGROUND OF THE INVENTION

Field of the Invention

Exemplary embodiments of the present invention relate to motor control, and particularly, to a method for controlling a motor based on a variable current controller gain and an eco vehicle thereof.

Description of Related Art

In general, an Interior Permanent Magnet (IPM) motor is controlled by a motor controller (or inverter), and the motor controller (or inverter) generates a current command through a current map in accordance with an input torque command and applies 3-phase current to the IPM motor through Pulse Width Modulation (PWM) control.

For this, in controlling the IPM motor, inductance and resistance values are used as gains of a current controller (or Proportional Integral (PI) controller).

As an example, the gain of the current controller (or PI controller) determines inductance by means of id/iq current (motor d/q-axis sensing current) on the basis of a room temperature of the motor, and is applied as follows using the resistance value as a constant.

d-axis current controller (or PI controller) Kp=Ld (d-axis inductance)

q-axis current controller (or PI controller) Kp=Lq (q-axis inductance)

current controller (or PI controller) Ki=Rs (motor resistance)

Accordingly, the IPM motor operates with a current gain that is suitable at a motor temperature of the room temperature to lower current ripple and motor vibration.

However, the 3-phase current motor application method in accordance with a current function of the current controller (or PI controller) is unable to reflect the change of the inductance and resistance that is caused by motor temperature increase, and thus current gain suitability may deteriorate as the motor temperature is increased from the room temperature to a high temperature.

As a result, the motor, and particularly, the IPM motor causes the current ripple and motor vibration to be intensified in accordance with the motor temperature increase, and this may cause the vibrations of an echo vehicle that adopts the IPM motor as a main driving source to be intensified.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a method for controlling a motor based on a variable current controller gain and an eco vehicle thereof, which can make inductance and resistance varied in accordance with a motor temperature change by using the gain of a current controller (or PI controller) as a function for current and motor temperature, and can greatly reduce vehicle vibration due to the motor by reducing current ripple and motor vibration through the variable inductance and the variable resistance.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an exemplary embodiment of the present invention, a method for controlling a motor based on a variable current controller gain includes when a torque command for a motor is detected by an inverter, generating a d-axis current command and a q-axis current command of the motor from the torque command; generating a d-axis detecting current and a q-axis detecting current through current conversion for a vector control after detecting 3-phase current that is applied to the motor; detecting a motor temperature from the motor, and determining a d-axis Kp gain, a q-axis Kp gain, and a Ki gain by matching the motor temperature to the d-axis Kp gain of a d-axis current motor inductance, the q-axis Kp gain of a q-axis current motor inductance, and the Ki gain of a motor resistance, which are respectively expressed by temperature functions; generating a d-axis voltage command and a q-axis voltage command from the d/q-axis current command, the d/q-axis detecting current, the d/q-axis Kp gain, and the Ki gain; and generating a new d-axis detecting current id and a q-axis detecting current iq by outputting and simultaneously detecting the d/q-axis voltage command as a 3-phase current that is applied to the motor.

The d/q-axis Kp gain may be heightened through temperature increase of the motor and may be lowered through temperature decrease of the motor, and the Ki gain may be lowered through the temperature increase of the motor and may be heightened through the temperature decrease of the motor.

The d-axis Kp gain may be generated as a variable Ld table in which a d-axis inductance reflection temperature and current match each other, the q-axis Kp gain may be generated as a variable Lq table in which a q-axis inductance reflection temperature and current match each other, the Ki gain may be generated as a variable Rs table in which a resistance reflection temperature and resistance match each other, and the variable Ld table, the variable Lq table, and the variable Rs table may be constructed as a variable control map.

The construction of the variable control map is performed by setting the d-axis inductance reflection temperature, the q-axis inductance reflection temperature, and the resistance reflection temperature at an operation temperature of the motor; dividing the d-axis inductance reflection temperature into low temperature/room temperature/high temperature sections and generating the variable Ld table through one-to-one (1:1) matching thereof to d-axis current values; dividing the q-axis inductance reflection temperature into low temperature/room temperature/high temperature sections and generating the variable Lq table through one-to-one (1:1) matching thereof to a q-axis current value; and generating the variable Rs table through one-to-one (1:1) matching of the resistance reflection temperature to a resistance value.

The one-to-one matching of the d-axis inductance reflection temperature to the d-axis current value may be performed through an increment of 10 A against an increment of 10° C. The one-to-one matching of the q-axis inductance reflection temperature to the q-axis current value may be performed through an increment of 10 A against an increment of 10° C. The one-to-one matching of the resistance reflection temperature to the resistance may be performed through an increment of 1 mΩ against an increment of 10° C.

In accordance with another exemplary embodiment of the present invention, an echo vehicle includes a motor control system configured to determine a d-axis Kp gain, a q-axis Kp gain, and a Ki gain by matching a motor temperature to a variable control map in which the d-axis Kp gain of a d-axis current motor inductance, the q-axis Kp gain of a q-axis current motor inductance, and the Ki gain of a motor resistance are respectively expressed by temperature functions when a torque command for a motor is input to an inverter, and to generate a d/q-axis voltage command from a d/q-axis current command and d/q-axis detecting current for 3-phase current that is applied to the motor to output the command as a 3-phase current that is applied to the motor.

The variable control map may include a variable Ld table in which a d-axis inductance reflection temperature and current match each other in a one-to-one manner to generate the d-axis Kp gain, a variable Lq table in which a q-axis inductance reflection temperature and current match each other in a one-to-one manner to generate the q-axis Kp gain, and a variable Rs table in which a resistance reflection temperature and resistance match each other in a one-to-one manner to generate the Ki gain. The motor control system may include an inverter that is provided with an Interior Permanent Magnet (IPM) type motor and a Proportional Integral (PI) type current controller.

The motor control system and the variable control map may be applied to a Hybrid Electric Vehicle (HEV), a Plug-in hybrid electric vehicle (PHEV), an electronic Vehicle (EV), and a Fuel Cell Electric Vehicle (FCEV).

The echo vehicle according to an exemplary embodiment of the present invention applies the IPM motor that is controlled by the variable current controller (or PI controller) as a main driving source, and thus has the following advantages and effects.

First, any separate hardwired addition is not required to reduce the current ripple, the motor vibration, and the vehicle vibration. Second, the durability of the motor is increased and the drivability is improved through reduction of the current ripple, the motor vibration, and the vehicle vibration. Third, battery power consumption is reduced through the reduction of the current ripple of the motor to achieve the fuel improvement effect. Fourth, the efficiency of the motor system is increased in comparison to that of the existing motor system to achieve the improvement of the traveling mode fuel ratio and real-road fuel ratio. Fifth, fuel consumption is reduced through the fuel ratio improvement of the echo vehicle to achieve the cost saving effect.

and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 1A and FIG. 1B are a flowchart illustrating a method for controlling a motor based on a variable current controller gain according to an exemplary embodiment of the present invention.

Figure 1A:
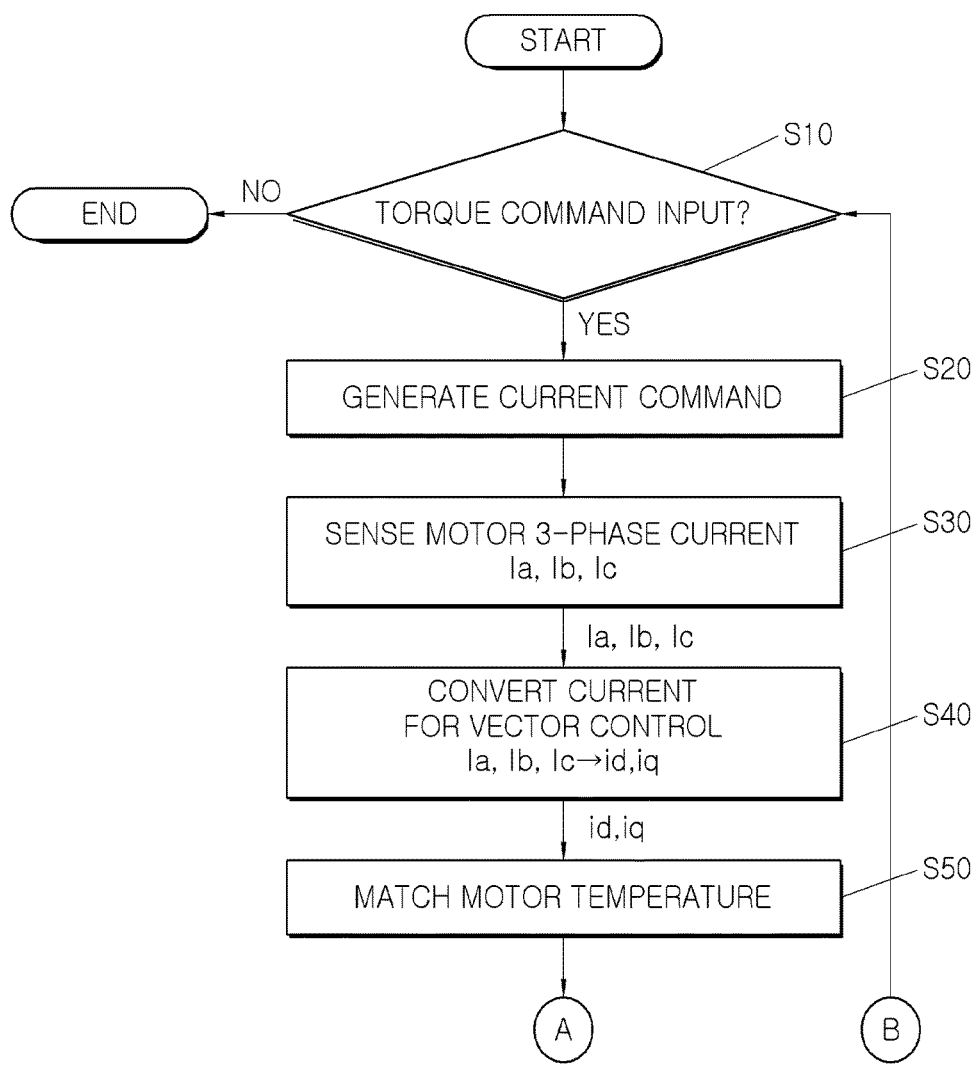

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Referring to FIG. 1A and FIG. 1B, according to a method for controlling a motor based on a variable current controller gain, a motor temperature is detected in accordance with a motor operation, the detected motor temperature matches a variable gain map in which a d-axis Kp gain, and 3-phase current in accordance with a torque command that is applied to an inverter is output to the motor as motor applied 3-phase current. Here, the d-axis Kp gain means a motor inductance for d-axis current, the q-axis Kp gain means a motor inductance for q-axis current, and the Ki gain means motor resistance. Further, the motor temperature is also used for motor over-temperature protection logic, and the motor over-temperature protection logic is a typical technology that is applied to motor control.

According to a current controller (or PI controller), unlike the existing current function type current controller that is unable to consider the change of inductance and resistance due to motor temperature increase when 3-phase current is applied to the motor, current gain suitability is not deteriorated due to the motor temperature increase. Accordingly, a method in which the current controller (or PI controller) prevents the current gain suitability from deteriorating in consideration of the change of inductance and resistance that is caused by the motor temperature increase is defined as a temperature function current applying mode.

Figure 2:
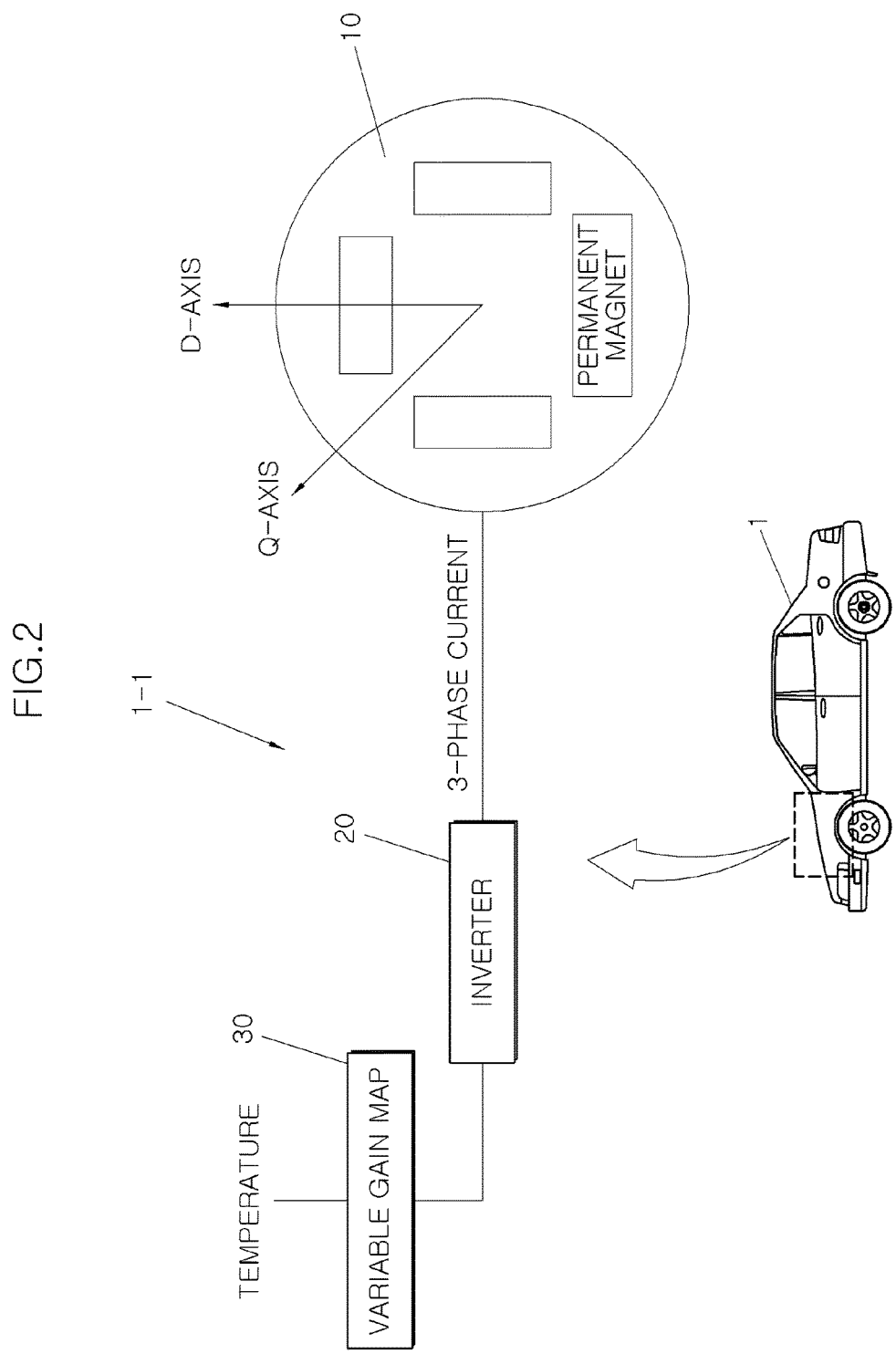
FIG. 2 is a diagram illustrating an example of an echo vehicle in which a motor control is performed on a basis of a variable current controller gain according to an exemplary embodiment of the present invention.

Referring to FIG. 2, an echo vehicle 1 includes a motor control system 1-1, and the motor control system 1-1 includes an IPM type motor 10, an inverter 20, and a current map 21. Further, although not illustrated, the motor control system 1-1 receives a torque command that is transmitted from an Motor Control Unit (MCU), and the MCU is a typical constituent element of the echo vehicle 1, which communicates with an engine control unit (ECU) (Electronic Control Unit) or an Hybrid Control Unit (HCU). In addition, the motor control system 1-1 is provided with a motor temperature sensor, and the temperature of the motor 10 that is detected by the motor temperature sensor is provided to the inverter 20 (or the current map 21).

The echo vehicle 1 includes a HEV (Hybrid Electric Vehicle), a Plug-in hybrid electric vehicle (PHEV), an electronic Vehicle (EV), and a Fuel Cell Electric Vehicle (FCEV).

Figure 3A:
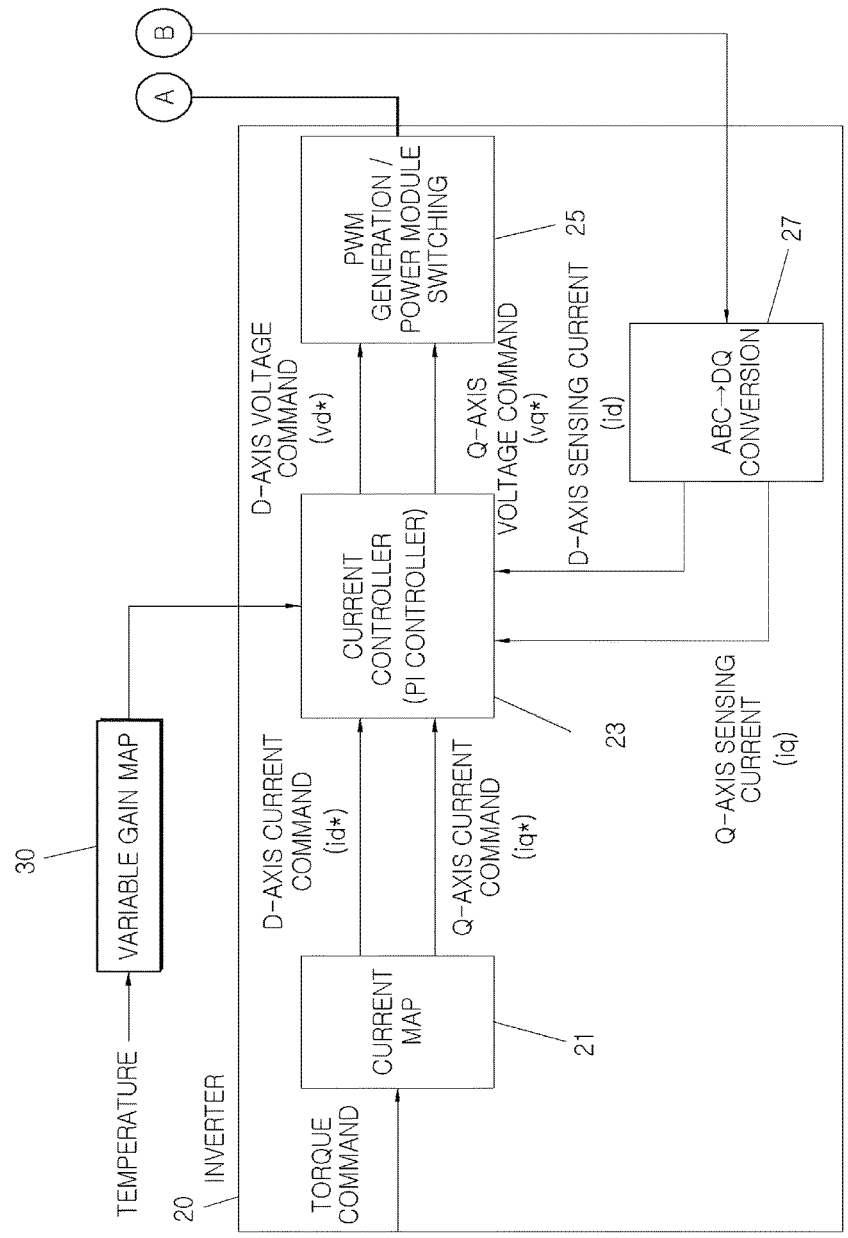
FIG. 3A and FIG. 3B are a diagram illustrating the configuration of an inverter that drives a motor based on a variable current controller gain according to an exemplary embodiment of the present invention.
Figure 3B:
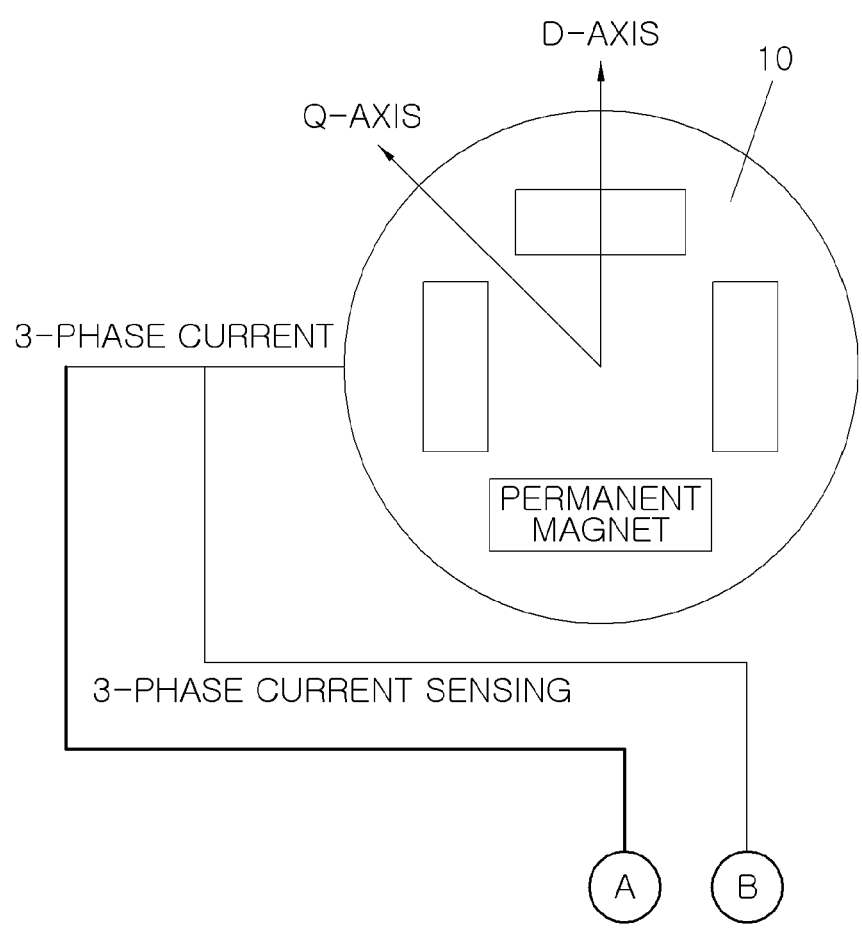

Specifically, the detailed configuration of the inverter 20 is exemplified through FIGS. 3A and 3B. As illustrated, the inverter 20 includes a current map 21 having a table for generating a d/q-axis current command of the motor 10, a current controller 23 configured to implement P (Proportional)/I (Integral) control, an outputter 25, and a current converter 27. As an example, the current map 21 receives an input of the torque command of the MCU (or engine ECU or HCU), and outputs a current command to the current controller 23. The current controller 23 outputs a voltage command to the outputter 25 in association with the current map 21, the current converter 27, and a variable control map 30. The outputter 25 applies 3-phase current to the motor 10. The current converter 27 detects the 3-phase current that is applied to the motor 10, performs current conversion for vector control, and then outputs the converted current to the current controller 23.

the variable control map 30 is exemplified through FIGS. 4A and 4B to 7.

Figure 4A:
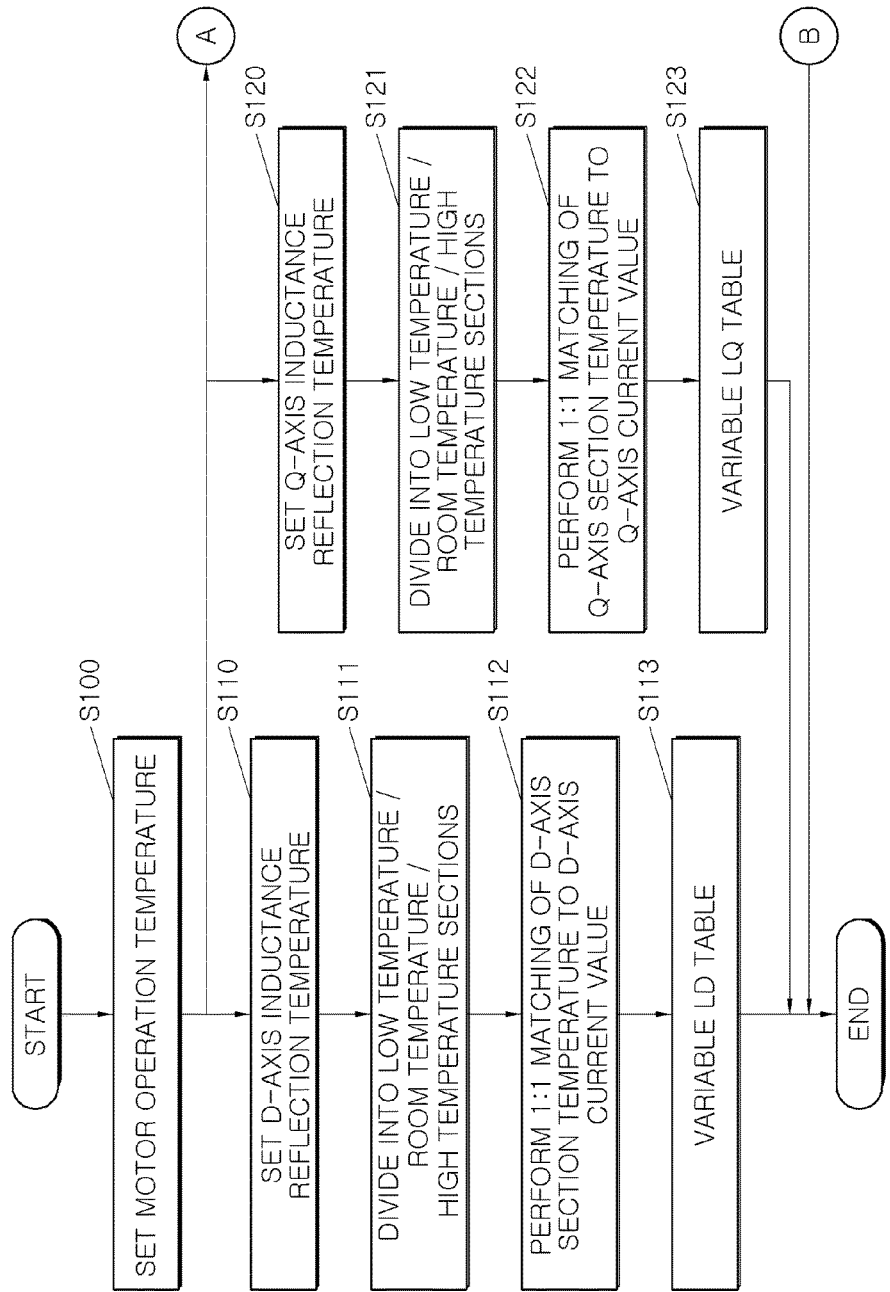
FIG. 4A and FIG. 4B are a flowchart illustrating a method for constructing a variable gain map for a variable current controller gain according to an exemplary embodiment of the present invention.
Figure 4B:
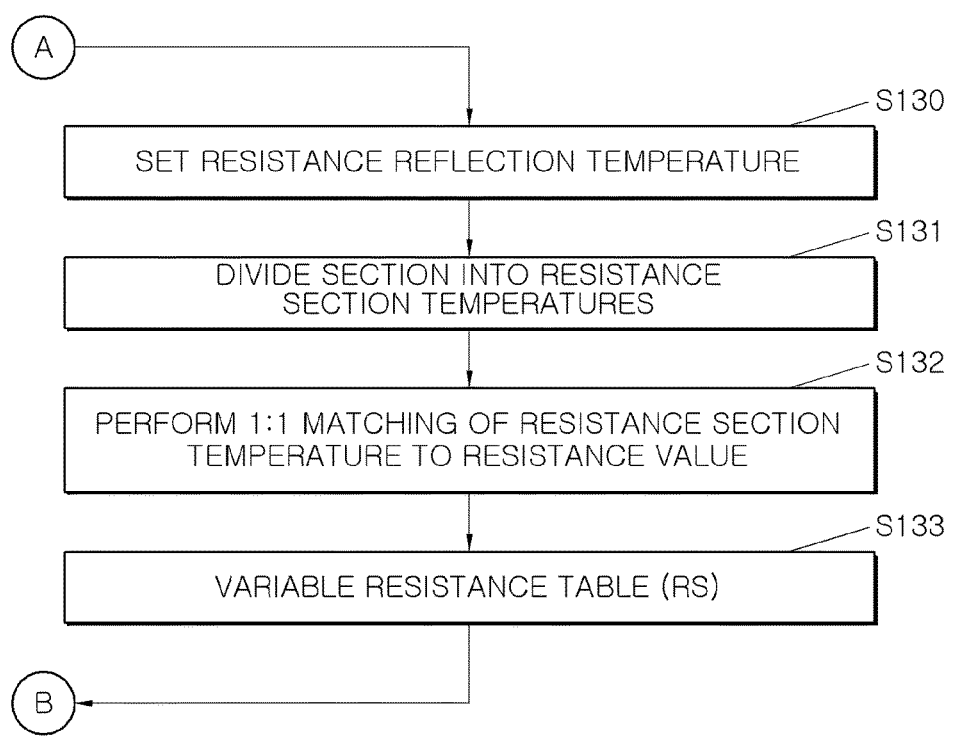

Referring to FIGS. 4A and 4B, a method for constructing a variable gain of a motor temperature function of the variable control map 30 may be known.

A motor operation temperature is set with respect to the motor 10 (S100), and a d-axis inductance reflection temperature is set with respect to the motor operation temperature (S110). Further, a q-axis inductance reflection temperature is set (S120), and a resistance reflection temperature is set (S130). As an example, if the motor operation temperature is set to −50 to 600° C., the d-axis inductance reflection temperature is set to 100 to 500° C., the q-axis inductance reflection temperature is set to 200 to 600° C., and the resistance reflection temperature is set to −50 to 200° C.

In the instant case, a variable Ld table, a variable Lq table, and a variable Rs table are constructed as follows.

In the case of the variable Ld table, low temperature/room temperature/high temperate sections are applied with respect to the set d-axis inductance reflection temperature (S111), each of the low temperature/room temperature/high temperate sections matches the d-axis current value (S112), and the variable Ld table is constructed (S113).

Figure 5:
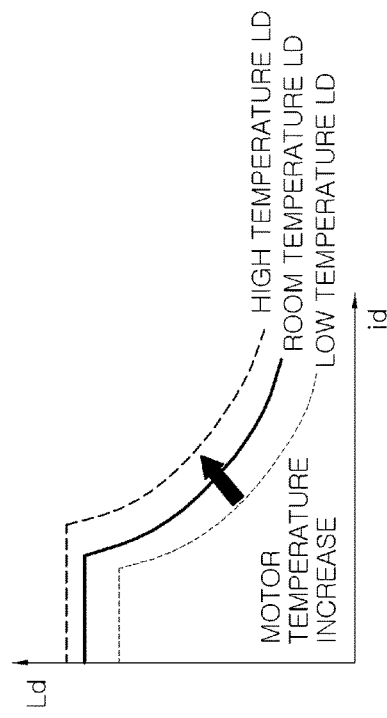
FIG. 5 is a diagram illustrating an example of a d-axis variable current controller (or PI controller) gain of a motor according to an exemplary embodiment of the present invention.

FIG. 5 exemplifies the variable Ld table. As illustrated, the d-axis inductance reflection temperature of 100 to 500° C. is divided into a low temperature section of 100 to 300° C., a room temperature section of 200 to 400° C., and a high temperature section of 300 to 500° C., and each of the sections of 100 to 300° C., 200 to 400° C., and 300 to 500° C. is divided into the minimum temperature to the maximum temperature in the temperature unit of 10° C. Further, the d-axis current value of 10 to 300 A is divided into the minimum current to the maximum current in the current unit of 10 A. Further, 100° C. of the low temperature section matches 300 A of the d-axis current value in a one-to-one manner (1:1) in the unit of 10° C. and 10 A. However, 300° C. of the low temperature section matches 20 A and 10 A of the d-axis current value in the same one-to-one manner. Such one-to-one matching is applied to 200° C. and 400° C. of the room temperature section and 300° C. and 500° C. of the high temperature section in the same manner. That is, the one-to-one matching of the d-axis inductance reflection temperature to the d-axis current value is performed with an increment of 10 A with respect to an increment of 10° C.

As a result, the variable Ld table expresses one-to-one matching relationship between 100 to 500° C. and 10 to 300 A from the relationship of d-axis Kp gain=Ld (id, motor temperature function), and the d-axis Kp gain is variably output to match the motor temperature increase and the motor temperature decrease like Ld-id line diagram.

In the case of the variable Lq table, the low temperature/room temperature/high temperature sections are applied with respect to the set q-axis inductance reflection temperature (S121), each of the low temperature/room temperature/high temperature sections matches the q-axis current value (S122), and the variable Lq table is constructed (S123).

Figure 6:
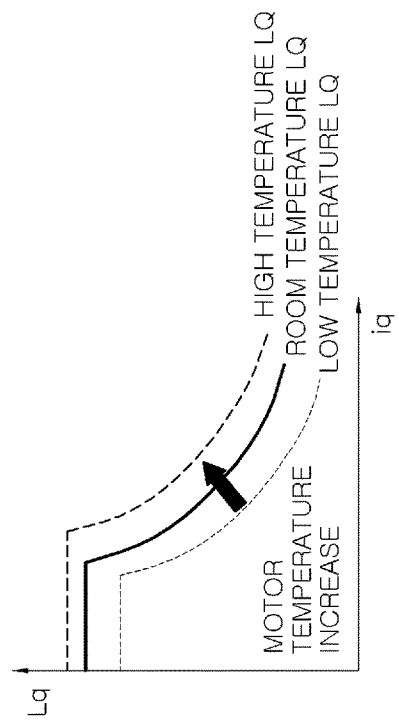
FIG. 6 is a diagram illustrating an example of a q-axis variable current controller (or PI controller) gain of a motor according to an exemplary embodiment of the present invention.

FIG. 6 exemplifies the variable Lq table. As illustrated, the q-axis inductance reflection temperature of 200 to 600° C. is divided into a low temperature section of 200 to 400° C., a room temperature section of 300 to 500° C., and a high temperature section of 400 to 600° C., and each of the sections of 200 to 400° C., 300 to 500° C., and 400 to 600° C. is divided into the minimum temperature to the maximum temperature in the temperature unit of 10° C. Further, the q-axis current value of 10 to 300 A is divided into the minimum current to the maximum current in the current unit of 10 A. Further, 200° C. of the low temperature section matches 300 A of the q-axis current value in a one-to-one manner (1:1) in the unit of 10° C. and 10 A. However, 400° C. of the low temperature section matches 20 A and 10 A of the q-axis current value in the same one-to-one manner. Such one-to-one matching is applied to 300° C. and 500° C. of the room temperature section and 400° C. and 600° C. of the high temperature section in the same manner. That is, the one-to-one matching of the q-axis inductance reflection temperature to the q-axis current value is performed with an increment of 10 A with respect to an increment of 10° C.

As a result, the variable Lq table expresses the one-to-one matching relationship between 200 to 600° C. and 10 to 300 A from the relationship of q-axis Kp gain=Lq (iq, motor temperature function), and the q-axis Kp gain is variably output to match the motor temperature increase and the motor temperature decrease like Lq-iq line diagram.

In the case of the variable Rs table, the resistance temperature section is applied with respect to the set resistance reflection temperature (S131), each of the resistance temperature sections matches the resistance values (S132), and the variable Rs table is constructed (S133).

Figure 7:
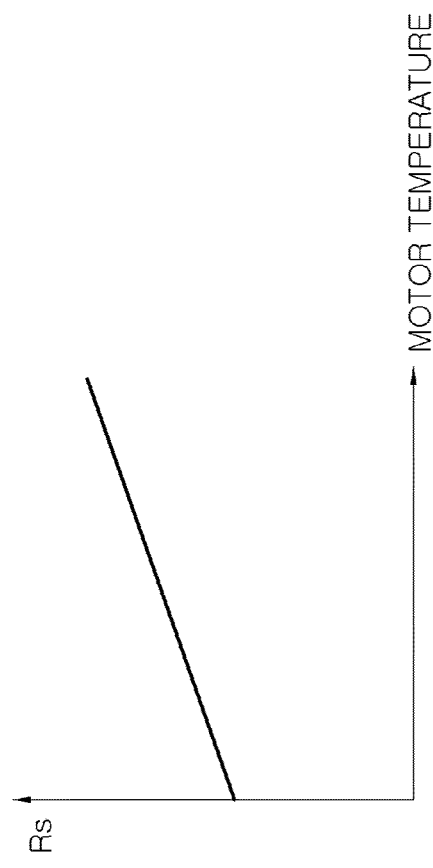
FIG. 7 is a diagram illustrating an example of a resistance variable current controller (or PI controller) gain of a motor according to an exemplary embodiment of the present invention.

FIG. 7 exemplifies the variable Rs table. As illustrated, the resistance reflection temperature of −59 to 200° C. is divided into the minimum temperature to the maximum temperature in the temperature unit of 10° C. Further, the resistance value of 76 to 100 mΩ is divided into the minimum resistance to the maximum resistance in the resistance unit of 1 mΩ. Further, −50° C. of the resistance reflection temperature matches 100 A of the resistance value in a one-to-one manner (1:1) in the unit of 10° C. and 1 mΩ. That is, the one-to-one matching of the resistance reflection temperature to the resistance is performed with an increment of 1 mΩ with respect to an increment of 10° C.

As a result, the variable Rs table expresses the one-to-one matching relationship between −50 to 200° C. and 76 to 100 mΩ from the relationship of Ki gain=Rs (motor temperature function), and the Ki gain is variably output to match the motor temperature increase and the motor temperature decrease like Rs—motor temperature line diagram.

Hereinafter, a method for controlling a motor based on a variable current controller gain of FIG. 1 will be described in detail with reference to FIGS. 3 to 7. In this case, the control subject is the inverter 20 having the current controller 23, and an object to be controlled is the motor 10 that is driven by the 3-phase current of the inverter 20.

A torque command is input to the inverter 20 (S10), and a current command is generated (S20). Further, 3-phase current that is applied to the motor 10 is detected (S30), and the detected 3-phase current is converted for vector control (S40).

Referring to FIGS. 3A and 3B, the current map 21 matches the torque command of an MCU (or engine ECU or HCU) to a constructed table, and then generates and outputs a d-axis current command id* and a q-axis current command iq*. Further, the current converter 27 detects the 3-phase current that is applied to the motor 10, and then generates and outputs a d-axis detecting current id and a q-axis detecting current that are converted for vector control. In the instant case, when it is assumed that the detected 3-phase current is defined as Ia, Ib, and Ic, the converted d-axis detecting current is defined as id, and the converted q-axis detecting current is defined as iq. Accordingly, the current controller 23 receives an input of d/q-axis current command id* and iq* of the current map 21 together with the d-axis detecting current id and the q-axis detecting current iq of the current converter 27.

Then, the inverter 20 performs motor temperature matching that is detected from the motor (S50), performs gain selection of the current controller through reading of the variable gain map (S60), and outputs a voltage command (S70).

Referring to FIGS. 3A and 3B, the current controller 23 matches the d-axis detecting current id and the q-axis detecting current iq that are compared with the d/q-axis current command id* and iq* to the motor detection temperature, and the variable control map 30 obtains a d-axis Kp gain, a q-axis Kp gain, and a Ki gain that match the motor detection temperature. This is confirmed from the relationship among d-axis Kp gain=Ld (id, motor temperature function), q-axis Kp gain=Lq (iq, motor temperature function), and Ki gain=Rs (motor temperature function). As a result, the current controller 23 generates a d-axis voltage command vd* and a q-axis voltage command vq* through applying the d-axis Kp gain, the q-axis Kp gain, and the Ki gain in consideration of the d/q-axis current command id* and iq*, the d/q-axis detecting current id and iq, and the motor temperature to output the generated commands to the outputter 25.

As an example, if the temperature of the motor 10 is increased from the room temperature to the high temperature, the d-axis Kp gain reflects a high temperature Ld line in the Ld-id line diagram of FIG. 5, the q-axis Kp gain reflects a high temperature Lq line in the Lq-iq line diagram of FIG. 6, and the Ki gain reflects the proportional relationship of the Rs—motor temperature line diagram of FIG. 7. As a result, the d/q-axis voltage command vd* and vq* of the current controller is generated in consideration of the d-axis Kp gain, the q-axis Kp gain, and the Ki gain.

Thereafter, the inverter 20 applies the 3-phase current to the motor 10 (S80), and the motor 10 is driven (S90).

Referring to FIGS. 3A and 3B, the outputter 25 generates the 3-phase current using the d/q-axis voltage command vd* and vq* of the current controller 23, and applied the generated 3-phase current to the motor 10. Accordingly, the current converter 27 detects the 3-phase current that is applied to the motor 10, and then generates and outputs the converted d-axis detecting current id and the q-axis detecting current iq for the vector control to the current controller 23. Typically, the motor 10 id driven in a manner that the MCU (or engine ECU or HCU) that monitors the motor driving generates and provides a new torque command to the inverter 20. Accordingly, the inverter 20 controls the driving of the motor 10 until the motor is stopped (e.g., vehicle start becomes off).

As described above, according to the echo vehicle in which the motor control based on the variable current controller gain is performed according to the embodiment, when the torque command for the motor 10 is input, the inductance and the resistance of the motor 10 is varied in accordance with the motor temperature change in the temperature function current applying mode in which the 3-phase current is applied to the motor 10 in consideration of the motor temperature of the motor 10 as a function. Accordingly, the current ripple and the motor vibration can be reduced, and in particular, the vibration of the echo vehicle 1 that is caused by the motor 10 can be greatly reduced.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for controlling a motor based on a variable current controller gain comprising a temperature function current applying mode in which when a torque command for the motor is detected by an inverter, 3-phase current to be applied to the motor is output to the motor in consideration of a motor temperature of the motor as a function, wherein the temperature function current applying mode includes:

generating a d-axis current command and a q-axis current command of the motor from the torque command;

generating a d-axis detecting current and a q-axis detecting current from the 3-phase current that is applied to the motor;

detecting the motor temperature from the motor, and determining a d-axis Kp gain, a q-axis Kp gain, and a Ki gain by matching the motor temperature to the d-axis Kp gain of a d-axis current motor inductance, the q-axis Kp gain of a q-axis current motor inductance, and the Ki gain of a motor resistance, which are respectively expressed by temperature functions;

generating a d-axis voltage command and a q-axis voltage command from the d/q-axis current command, the d/q-axis detecting current, the d/q-axis Kp gain, and the Ki gain; and outputting the d/q-axis voltage command as the 3-phase current that is applied to the motor.

2. The method according to claim 1, wherein the d-axis detecting current and the q-axis detecting current are generated through current conversion for vector control after being detected.

3. The method according to claim 1, wherein the 3-phase current that is applied to the motor is detected and generated as the d-axis detecting current and the q-axis detecting current.

4. The method according to claim 1, wherein the d/q-axis Kp gain is heightened through a temperature increase of the motor and is lowered through a temperature decrease of the motor, and the Ki gain is lowered through the temperature increase of the motor and is heightened through the temperature decrease of the motor.

5. The method according to claim 1, wherein the d-axis Kp gain is generated as a variable Ld table in which a d-axis inductance reflection temperature and current match each other, the q-axis Kp gain is generated as a variable Lq table in which a q-axis inductance reflection temperature and current match each other, the Ki gain is generated as a variable Rs table in which a resistance reflection temperature and resistance match each other, and the variable Ld table, the variable Lq table, and the variable Rs table are constructed as a variable control map.

6. The method according to claim 5, wherein construction of the variable control map is performed by setting the d-axis inductance reflection temperature, the q-axis inductance reflection temperature, and the resistance reflection temperature at an operation temperature of the motor; dividing the d-axis inductance reflection temperature into sections and generating the variable Ld table through one-to-one (1:1) matching of the sections to d-axis current values; dividing the q-axis inductance reflection temperature into sections and generating the variable Lq table through one-to-one (1:1) matching of the sections to a q-axis current value; and generating the variable Rs table through one-to-one (1:1) matching of the resistance reflection temperature to a resistance value.

7. The method according to claim 6, wherein each of the d-axis inductance reflection temperature and the q-axis inductance reflection temperature is divided into a low temperature section, a room temperature section, and a high temperature section.

8. The method according to claim 6, wherein the one-to-one matching of the d-axis inductance reflection temperature to the d-axis current value is performed through an increment of 10 A against an increment of 10° C.

9. The method according to claim 6, wherein the one-to-one matching of the q-axis inductance reflection temperature to the q-axis current value is performed through an increment of 10 A against an increment of 10° C.

10. The method according to claim 6, wherein the one-to-one matching of the resistance reflection temperature to the resistance is performed through an increment of 1 mΩ against an increment of 10° C.

11. An echo vehicle comprising:

a motor control system configured to determine a d-axis Kp gain, a q-axis Kp gain, and a Ki gain by matching a motor temperature to a variable control map in which the d-axis Kp gain of a d-axis current motor inductance, the q-axis Kp gain of a q-axis current motor inductance, and the Ki gain of a motor resistance are respectively expressed by temperature functions when a torque command for a motor is input to an inverter, and to generate a d/q-axis voltage command from a d/q-axis current command and d/q-axis detecting current for 3-phase current that is applied to the motor to output the generated voltage command as a 3-phase current that is applied to the motor; and a variable control map configured to express a d-axis Kp gain and a q-axis Kp gain of motor inductance and a Ki gain of motor resistance as motor temperature functions, and to provide the d-axis Kp gain, the q-axis Kp gain, and the Ki gain, which match a detected motor temperature to the motor control system.

12. The echo vehicle according to claim 11, wherein the motor control system includes an inverter together with the motor;

the motor is an Interior Permanent Magnet (IPM) motor; and the inverter includes a current map configured to generate a d/q-axis current command of the motor, a current converter configured to generate d/q-axis detecting current through conversion of the 3-phase current that is applied to the motor after being sensed, a current controller configured to generate a d-axis voltage command and a q-axis voltage command from the d/q-axis current command, the d/q-axis detecting current, the d/q-axis Kp gain, and the Ki gain together with determination of the d/q-axis Kp gain of the motor inductance and the Ki gain of the motor resistance by matching the d/q-axis current command, the d/q-axis detecting current, and the motor temperature detected from the motor to the variable control map, and an outputter configured to output the d/q-axis voltage command to the motor as the 3-phase current that is applied to the motor.

13. The echo vehicle according to claim 12, wherein the current controller is a Proportional Integral (PI) controller.

14. The echo vehicle according to claim 11, wherein the variable control map includes a variable Ld table in which a d-axis inductance reflection temperature and current match each other in a one-to-one manner to generate the d-axis Kp gain, a variable Lq table in which a q-axis inductance reflection temperature and current match each other in a one-to-one manner to generate the q-axis Kp gain, and a variable Rs table in which a resistance reflection temperature and resistance match each other in a one-to-one manner to generate the Ki gain.

15. The echo vehicle according to claim 14, wherein the variable Ld table is configured so that the d-axis inductance reflection temperature of 100 to 500° C. is divided into a low temperature section of 100 to 300° C., a room temperature section of 200 to 400° C., and a high temperature section of 300 to 500° C., and each of the low temperature section, the room temperature section, and the high temperature section matches an increment of 10 A with respect to motor current of 10 to 300 A and an increment of 10° C. in a one-to-one manner.

16. The echo vehicle according to claim 14, wherein the variable Lq table is configured so that the d-axis inductance reflection temperature of 100 to 500° C. is divided into a low temperature section of 200 to 400° C., a room temperature section of 300 to 500° C., and a high temperature section of 400 to 600° C., and each of the low temperature section, the room temperature section, and the high temperature section matches an increment of 10 A with respect to motor current of 10 to 300 A and an increment of 10° C. in a one-to-one manner.

17. The echo vehicle according to claim 14, wherein the variable Rs table is configured so that a resistance reflection temperature of −50 to 200° C. matches an increment of 1 mΩ with respect to motor resistance of 76 to 100 mΩ and an increment of 10° C. in a one-to-one manner.

18. The echo vehicle according to claim 11, wherein the motor control system and the variable control map are applied to a Hybrid Electric Vehicle (HEV), a Plug-in hybrid electric vehicle (PHEV), an EV electronic Vehicle (EV), and an Fuel Cell Electric Vehicle (FCEV).

* * * * *